(12) United States Patent
Harvey (10) Patent No.: US 8,868,845 B1
(45) Date of Patent: Oct. 21, 2014

(54) DYNAMIC SINGLE/MULTI-READER, SINGLE-WRITER SPINLOCKS

(75) Inventor: David W. Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 874 days.

(21) Appl. No.: 13/077,429

(22) Filed: Mar. 31, 2011

(51) Int. Cl.
*G06F 12/00* (2006.01)
*G06F 13/00* (2006.01)
*G06F 13/28* (2006.01)
*G06F 12/14* (2006.01)

(52) U.S. Cl.
USPC ........... 711/141; 711/145; 711/151; 711/152; 710/200; 718/102

(58) Field of Classification Search
None
See application file for complete search history.

(56) References Cited

U.S. PATENT DOCUMENTS 6,601,120 B1 * 7/2003 Schimmel ..................... 710/107
2002/0199045 A1 * 12/2002 Browning et al. ............ 710/100

* cited by examiner

*Primary Examiner* — Tuan Thai
*Assistant Examiner* — Marwan Ayash
(74) *Attorney, Agent, or Firm* — Krishnendu Gupta; Gerald P. Kazanjian (57) ABSTRACT

Example embodiments of the present invention include a method, system and computer program product for managing spinlocks in a multi-core computer system. The method comprises providing a spinlock per core in the multi-core computer system and storing each spinlock in a respective memory location configured to be access independently by respective cores of the multi-core computer system. A request is then received at a core in the multi-core computer system to perform an operation on a spinlock in the multi-core computer system. A multi-reader/single writer spinlock is obtained in response to the request.

17 Claims, 8 Drawing Sheets

DYNAMIC SINGLE/MULTI-READER, SINGLE-WRITER SPINLOCKS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to implementing spinlocks in a multi-core computer system.

BACKGROUND

In software engineering, a spinlock is a lock where a thread simply waits in a loop (i.e., "spins") repeatedly checking until the lock becomes available. As the thread remains active but isn't performing a useful task, the use of such a lock is a kind of busy waiting. Once acquired, spinlocks will usually be held until they are explicitly released, although in some implementations they may be automatically released if the thread being waited on (i.e., that which holds the lock) blocks, or goes to sleep.

Spinlocks are efficient if threads are only likely to be blocked for a short period of time, as they avoid overhead from operating system process re-scheduling or context switching. For this reason, spinlocks are often used inside operating system kernels. However, spinlocks become wasteful if held for longer durations, both preventing other threads from running and requiring re-scheduling. The longer a lock is held by a thread, the greater the risk that it will be interrupted by the operating system scheduler while holding the lock. If this happens, other threads will be left "spinning" (i.e., repeatedly trying to acquire the lock), while the thread holding the lock is not making progress towards releasing it. The result is an indefinite postponement until the thread holding the lock can finish and release it. This is especially true on a single-processor system, where each waiting thread of the same priority is likely to waste its quantum (allocated time where a thread can run) spinning until the thread that holds the lock is finally finished. Implementing spinlocks correctly is difficult because one must take into account the possibility of simultaneous access to the lock to prevent race conditions.

CPU caches for multiple core computers (e.g., multi-processor and multi-core computers) are often implemented using the MESI protocol or a variant thereof. Such protocols have the characteristic that if the same cache line is accessed for reading from one or multiple cores, or only read and written on a single core, the performance is good. But if the cache line is written on at least one core and read or written by other cores, the performance significantly degrades. Such degradation can be expected by design or can be due to false sharing. False sharing occurs when two logically separate memory locations are allocated the same cache line, and logically independent accesses from different cores suffer such performance degradation. Accordingly, a spinlock which is accessed from multiple cores will see the performance degradation due to multiple cores accessing the same cache line, as well as time spent doing a "busy wait".

A known variant of the spinlock allows multiple readers and a single writer to use multiple bits in a byte, with a bit corresponding to each core. A core that wishes to be a writer must be able to set all of the bits associated with all cores; each core that wishes to only read need only set one bit. This variant allows readers to avoid "busy waiting" when other cores are only reading. It requires a "compare and exchange" or similar instruction in order to examine and change the values of all of the bits atomically.

SUMMARY

Example embodiments of the present invention include a method, system and computer program product for managing spinlocks in a multi-core computer system. The method comprises providing a spinlock per core in the multi-core computer system and storing each spinlock in a respective memory location configured to be access independently by respective cores of the multi-core computer system. A request is then received at a core in the multi-core computer system to perform an operation on a spinlock in the multi-core computer system. A multi-reader/single writer spinlock is obtained in response to the request.

BRIEF DESCRIPTION OF THE DRAWINGS

The above and further advantages of the present invention may be better under stood by referring to the following description taken into conjunction with the accompanying drawings in which.

DETAILED DESCRIPTION

However, the spinlocks described above suffer from numerous deficiencies, including performance degradation due to access to the same cache line and writers busy waiting. Further, the number of bits that can be used to store the spinlocks is limited to the number of bits that can be atomically managed with the "compare and exchange" instruction. Additionally, performance is degraded by having to move cache lines from memory to caches of respective cores.

Figure 1:
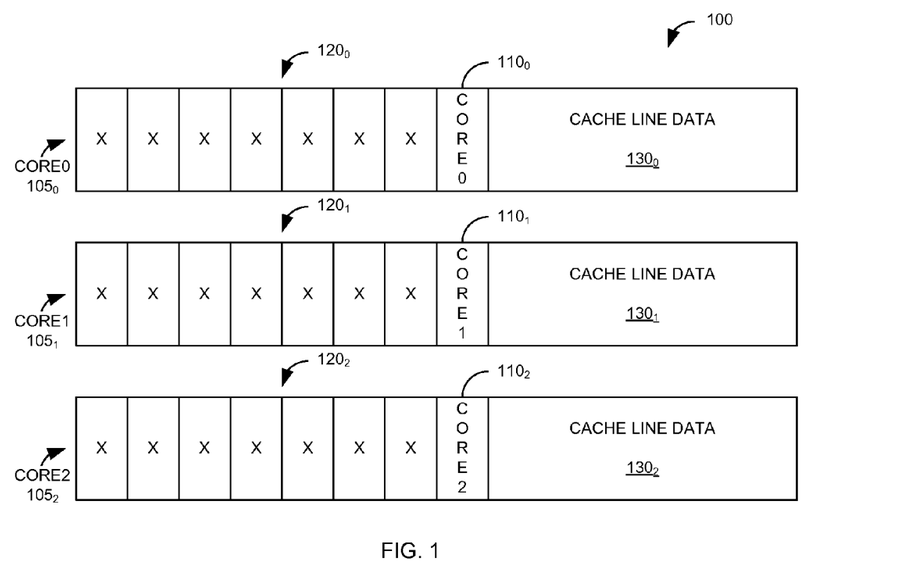
FIG. 1 is a block diagram of a memory layout illustrating storing a multi reader/single writer spinlock for three cores on respective cache lines allowing three simultaneous readers and one writer according to an example embodiment of the present invention.

Example embodiments of the present invention overcome these and other deficiencies by providing a multi-reader/single writer spinlock. FIG. 1 is a block diagram of a memory layout 100 illustrating storing a multi-reader/single writer spinlock for three cores (i.e., 0-2) on respective cache lines $105_0$-$105_2$ allowing three simultaneous readers and one writer according to an example embodiment of the present invention. As illustrated in FIG. 1, rather than arranging the per-core lock bits within one word, example embodiments of the present invention spread out those bits $110_0$-$110_2$ (110 generally) to separate bytes $120_0$-$120_2$ (120 generally), with each of those bytes spread out onto separate cache lines $105_0$-$105_2$ (105 generally) to avoid false sharing for read locks.

Figure 2:
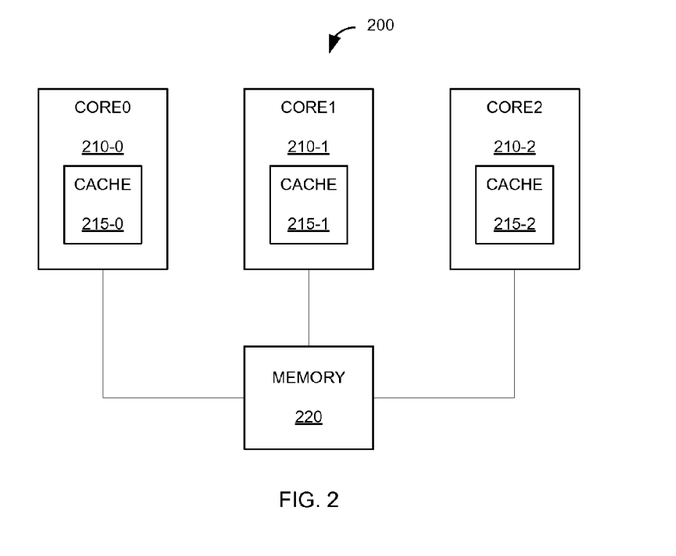
FIG. 2 is a block diagram illustrating a multi-core computer system including three cores each having a respective cache that is configured to retrieve data from and store data to memory.

FIG. 2 is a block diagram illustrating a multi-core computer system 200 including three cores 210 (i.e., CORE0CORE0 210-0, CORE1 210-1 and CORE2 210-2) each having a respective cache 215-0-215-2 that is configured to retrieve data from and store data to memory 220. The description of FIG. 2 is intended to be read in conjunction with FIG. 1. Each core 210 performing a read lock operation may read and write its respective cache line 105 (i.e., CORE0CORE0 210-0 accesses the cache line $105_0$ for CORE0CORE0, CORE1 210-1 accesses the cache line $105_1$ for CORE1 and CORE2 210-2 accesses cache line $105_2$ for CORE2) eliminating performance degradation due to multiple readers. However, a core 210 performing a write lock operation must acquire all cores' read locks $110_0$-$110_2$, possibly dirtying cache line data $130_0$-$130_2$ for each cache line 105. Therefore the multi-reader/single writer spinlock arrangement of FIG. 1 provides lower overhead for readers (i.e., only one lock must be obtained for readers) but requires greater overhead for writers (i.e., all locks must be obtained for writers) than single reader/single writer spinlocks. It should be understood that the bits represented by the "x"s in the bytes 120 may be unused or used to store other data.

It should be understood that the values CORE0CORE0, CORE1 and CORE2 in spinlock bits $110_0$-$110_2$, respectively, represent the value of those bits for the multi-reader/single writer lock, with 0 indicating unlocked and 1 indicating locked. Initially the state of the lock bits 110 is (0,0,0) (i.e., all locks are unlocked). If CORE1 210-1 gets a read lock, the state of the lock bits 110 becomes (0,1,0). When CORE1 210-1 releases its lock the state of the lock bits 110 returns to (0,0,0). If CORE1 210-1 gets a read lock and then CORE2 210-2 gets a read lock, the state of the lock bits 110 is (0,1,1) (i.e., (0,0,0) (0,1,0) (0,1,1) in successive cycles). If CORE0CORE0 210-0 then tries to obtain a write lock, it would acquire the read lock for CORE0CORE0 $110_0$ (i.e., a lock bit state of (1,1,1)). Then CORE0 210-0 would wait for CORE1 210-1 to release its read lock (i.e., wait for the lock bit state to transition to (1,0,1)) and then CORE0 210-0 would acquire the read lock for CORE1 $110_1$ (i.e., a lock bit state of (1,1,1)). CORE0 210-0 then would wait for CORE2 210-2 to release its read lock $110_2$ (i.e., wait for the lock bit state to transition to (1,1,0)) and then CORE0 210-0 would acquire the read lock for CORE2 $110_2$ (i.e., a lock bit state of (1,1,1)). As the holder of a write lock for all lock bits $110_0$-$110_2$, CORE0 210-0 has write access. When complete, CORE0 210-0 releases its write lock (i.e., returns the lock bit state to (0,0,0)).

Figure 3:
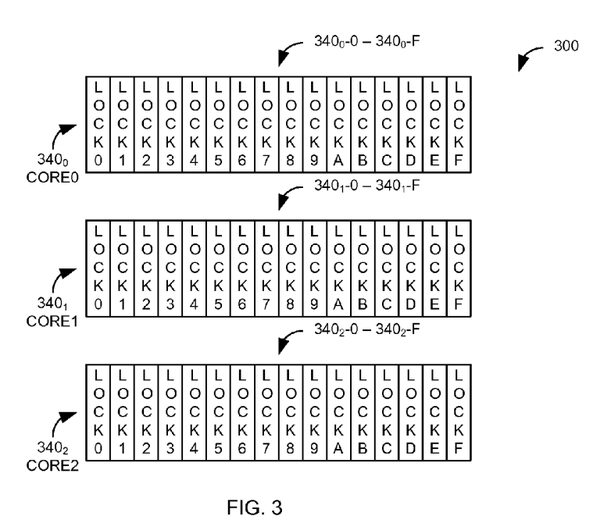
FIG. 3 is a block diagram illustrating a further extension of the multi-reader/single writer spinlock as a multi-reader/single writer spinlock array.

FIG. 3 is a block diagram illustrating a further extension of the multi-reader/single writer spinlock as a multi-reader/single writer spinlock array 300. The multi-reader/single writer spinlock array 300 allows for many locks $340_0$-0-$340_0$-F, $340_1$-0-$340_1$-F and $340_2$-0-$340_2$-F (340 generally), but in a more memory efficient manner than in the multi-reader/single writer spinlocks of FIG. 1, using one bit per core per lock. The description of FIG. 3 is intended to be read in conjunction with FIG. 2. As illustrated in FIG. 3, each column represents a separate lock 340-0-340-F. For cores 210 performing a read lock there is no degradation due to cache line contention because each core 210 still accesses a private cache line (i.e., CORE0 210-0 accesses the cache line $340_0$ for CORE0, CORE1 210-1 accesses the cache line $340_1$ for CORE1 and CORE2 210-2 accesses cache line $340_2$ for CORE2). Similar to multi-reader/single writer spinlocks described above, writers have all of the overhead of obtaining a lock for each core. However, there is potential for writers to incur false sharing with readers of different locks, along with false sharing with other writers.

Multi-reader single write locks and multi-reader single write lock arrays provide significant performance advantages when lock acquisitions are for reading by avoiding sharing of dirty cache lines; however, they suffer from performance disadvantages when the locks are acquired for writing. However, if a programmer properly understands or is able to estimate or predict what the frequency of read locks versus write locks will be for various locks, the programmer could decide to use one type of lock or the other (i.e., a traditional spinlock or a multi-reader single write).

Figure 4:
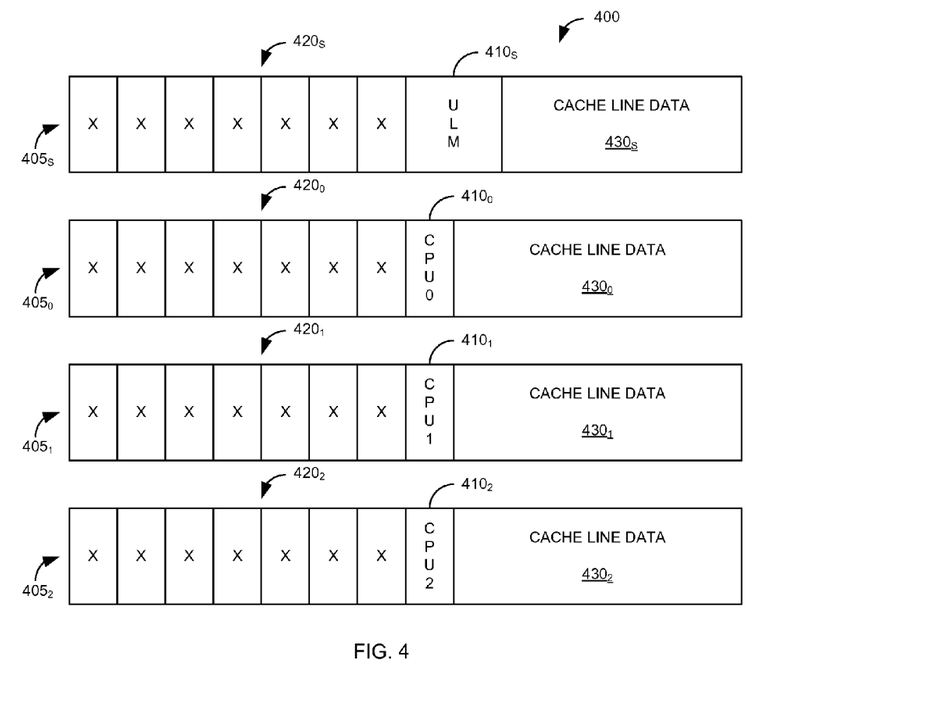
FIG. 4 is a block diagram of a memory layout for a dynamic multi-reader/single writer lock.

FIG. 4 is a block diagram of a memory layout 400 for a dynamic multi-reader/single writer lock which performs as well as the traditional spinlock when most of the accesses are for writing but performs as well has the multi-reader single write locks when almost all of the accesses are for reading. A dynamic multi-reader/single writer lock includes a multi-reader/single writer lock per core $410_0$-$410_2$ and a separate cache line $405_S$ with two bits of state information $410_S$. The state $410_S$ may be unlocked (U), locked (L) (i.e., indicating a single writer) or multi-reader lock (M) (i.e., indicating multiple readers). Changes to the state $410_S$ are made using a "compare and exchange" instruction so that the change is atomic. As with the multi-reader/single writer lock discussed above with respect to FIG. 1, each cache line $405_S$-$405_2$ may include unused bits $420_S$-$420_2$ and cache line data $430_S$-$430_2$, respectively.

Figure 5:
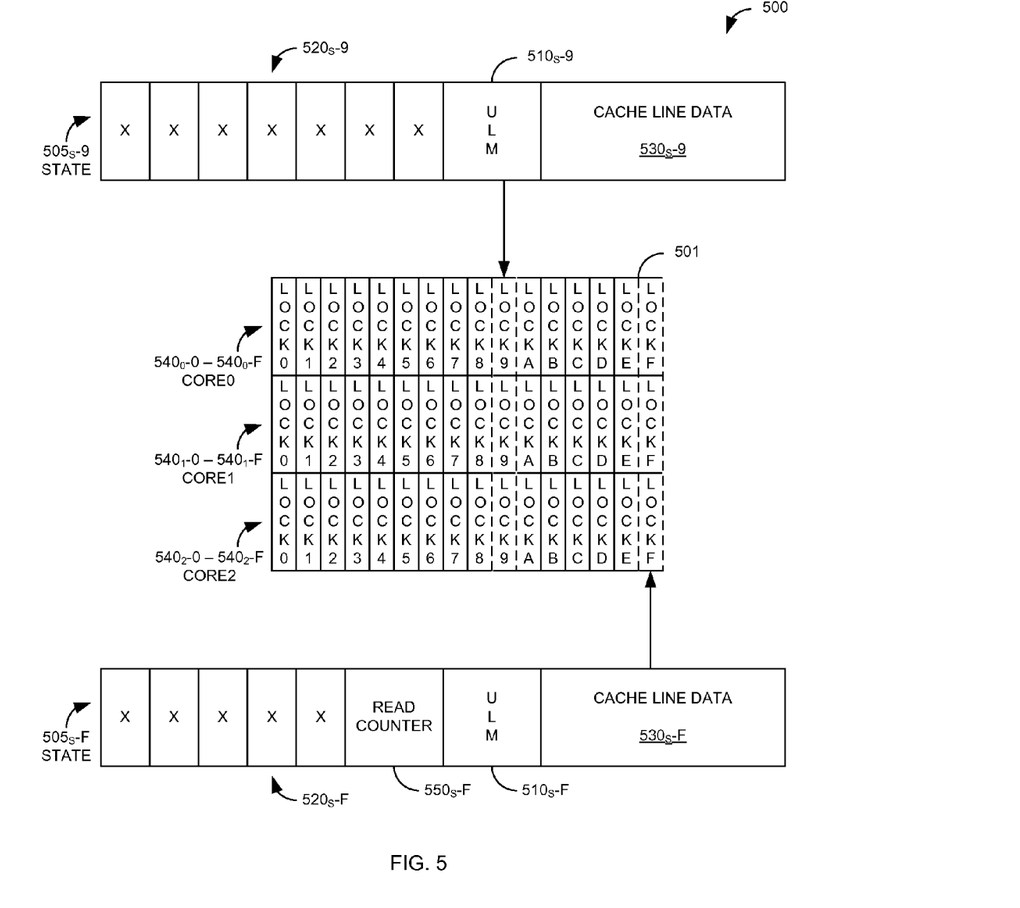
FIG. 5 is a block diagram illustrating a memory layout of a combination of a dynamic multi-reader/single writer spinlock with a multi-reader/single writer spinlock array.

FIG. 5 is a block diagram illustrating a memory layout 500 of a combination of a dynamic multi-reader/single writer spinlock with a multi-reader/single writer spinlock array 501. As described with respect to FIG. 3 above, the multi-reader/single writer spinlock array 501 allows for many locks $540_0$-0-$540_0$-F, $540_1$-0-$540_1$-F and $540_2$-0-$540_2$-F (540 generally), but in a more memory efficient manner than in the dynamic multi-reader/single writer spinlocks of FIG. 4, using one bit per core per lock. Each lock 0-F is associated with a cache line $505_S$-0-$505_S$-F (505 generally) elsewhere in memory storing state information $510_S$-0-$510_S$-F (510 generally) (e.g., U, L or M) for each lock 0-F. False sharing, which occurs for writers, is reduced to the cases where the state is converted from the M back to the U state. L-to-U and U-to-L transitions do not touch the multi-reader/single writer spinlock array and, therefore, cause no additional false sharing.

As illustrated in FIG. 5, lock 9 is associated with a cache line $505_S$-9 storing state information $510_S$-9 for the dynamic multi-reader/single writer spinlock. As with the multi-reader/single writer lock discussed above with respect to FIGS. 1 and 4, each cache line 505 may include unused bits $520_S$-9 and cache line data $530_S$-9, respectively. In certain embodiments, as illustrated with respect to lock F, the unused bits $520_S$-F may include a read counter $550_S$-F to reduce the number of M-to-U transitions. A counter tracks the number of read operations in the U and L states. A write operation zeros the counter. Unused bits could store, in the U state, the core number of the last reader. Accordingly, the counter would increment only if the core number was different, thereby avoiding changing to a multi-reader lock when there is only one reader. Therefore, transitions from U to M are reduced, thereby reducing the number of M-to-U transitions.

Sample code for implementing the dynamic multi-reader/single writer spinlock of the present invention may be found at the end of the specification.

Figure 6A:
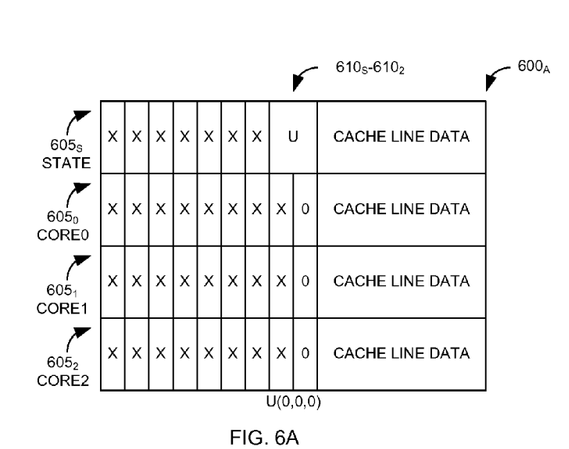
FIGS. 6A-6P are block diagrams illustrating memory layouts of a dynamic multi-reader/single writer lock transitioning between various states.
Figure 6B:
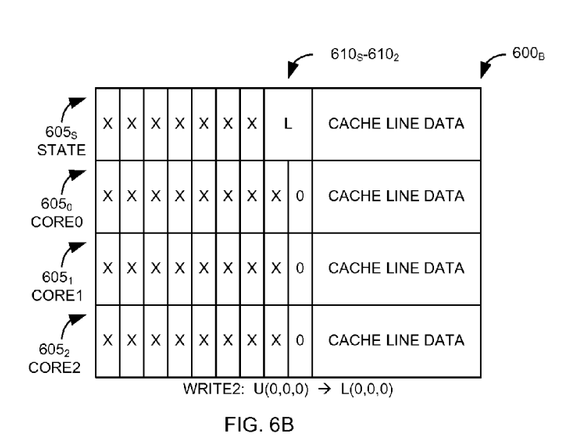
Figure 6C:
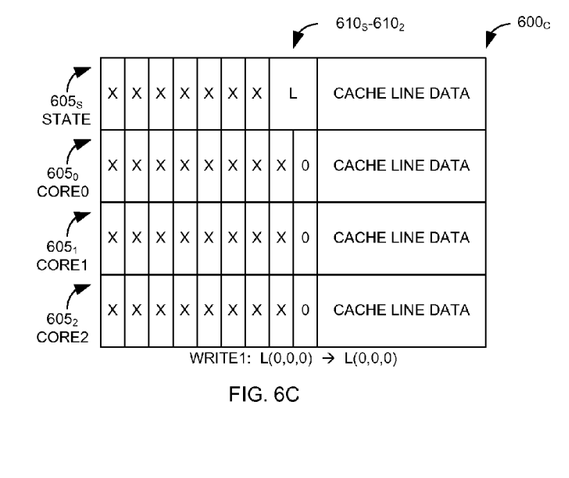
Figure 6D:
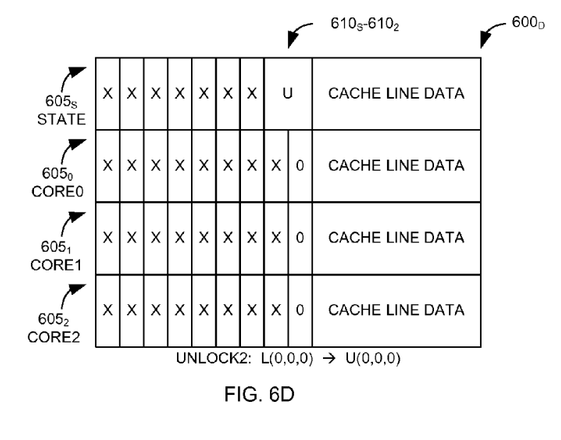
Figure 6E:
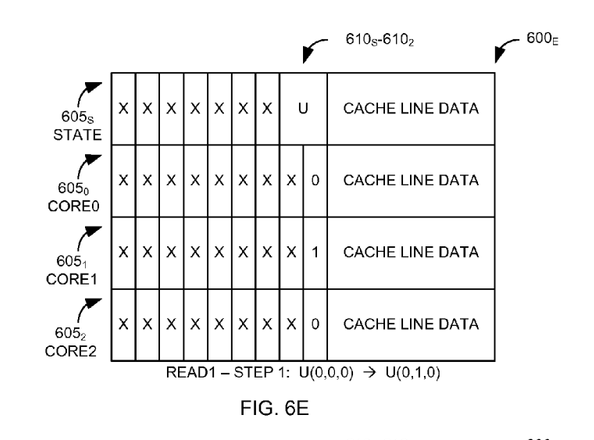
Figure 6F:
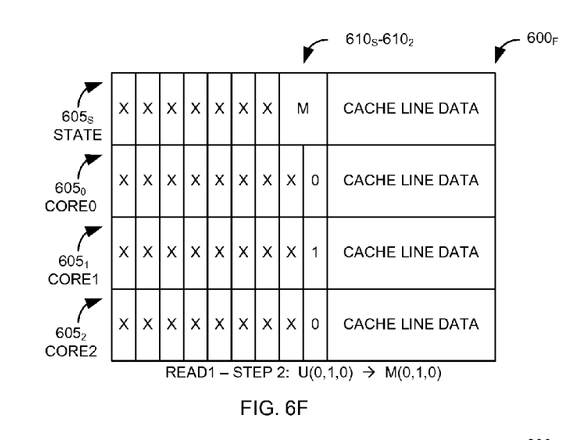
Figure 6G:
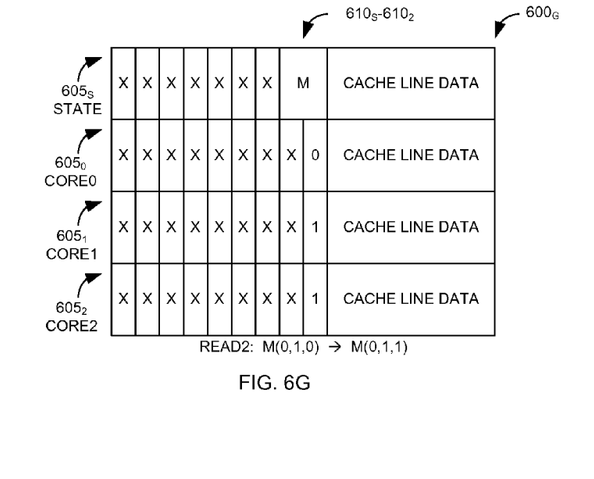
Figure 6H:
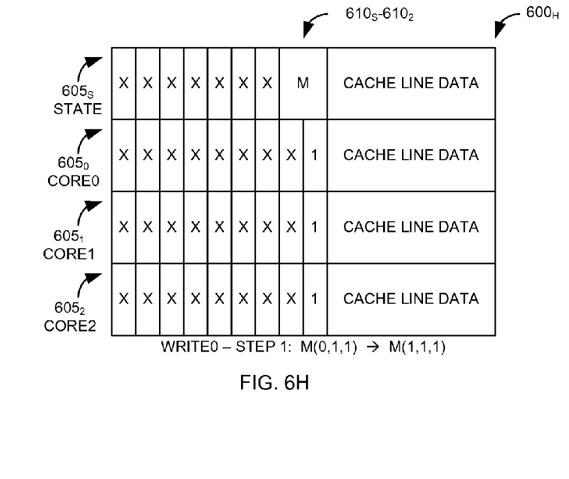
Figure 6I:
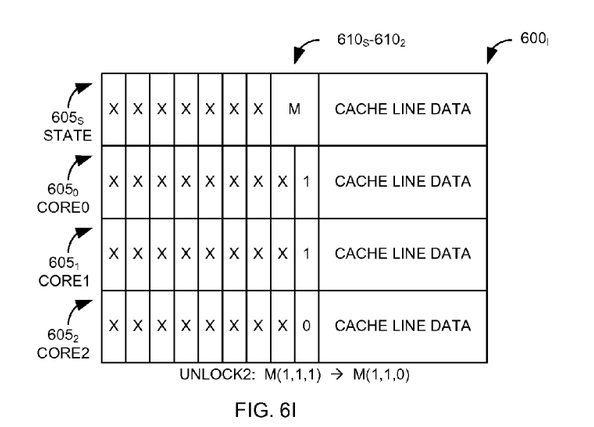
Figure 6J:
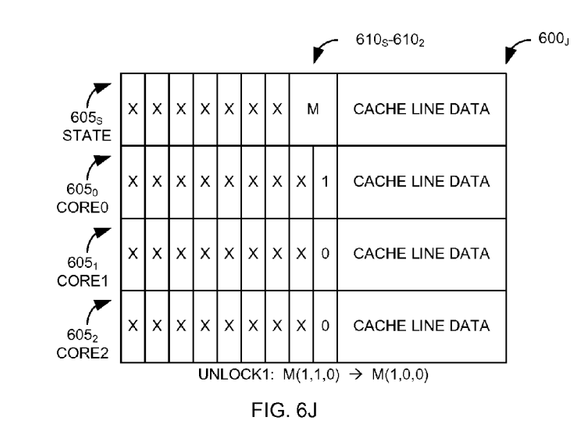
Figure 6K:
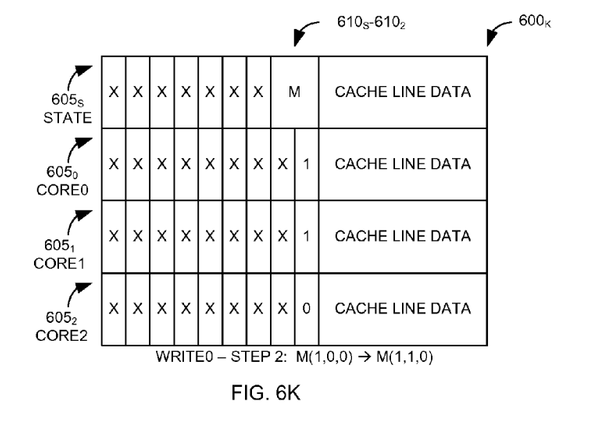
Figure 6L:
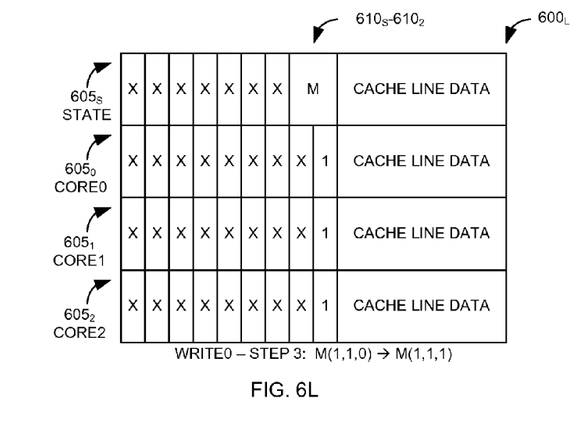
Figure 6M:
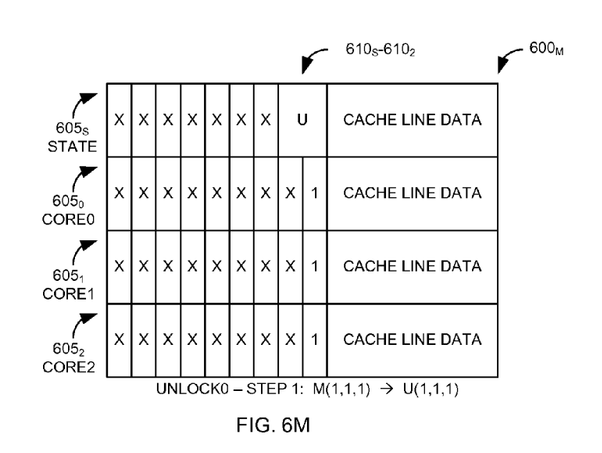
Figure 6N:
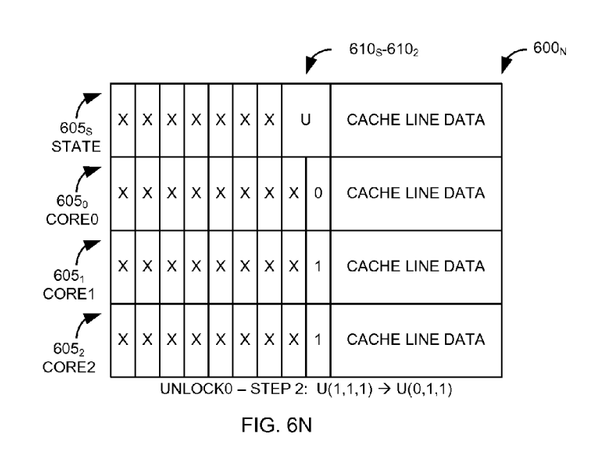
Figure 6O:
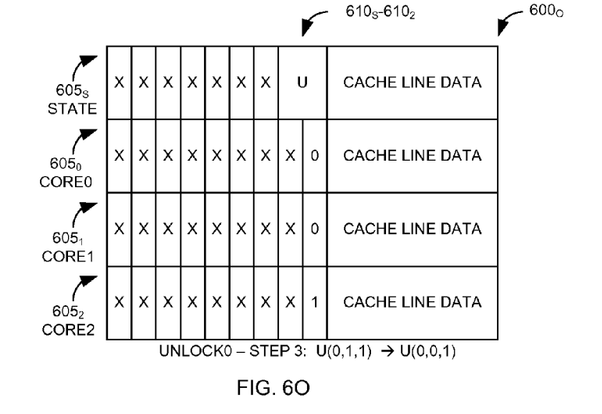

FIGS. 6A-6O are block diagrams illustrating memory layouts $600_A$-$600_O$ of a dynamic multi-reader/single writer lock transitioning between various states. As illustrated in FIGS. 6A-6O, READ#:,WRITE#: and UNLOCK# indicate operations from the numbered (i.e., #) core; U, L and M indicate the state of the lock and (X,Y,Z) indicates the bit value of each core's lock.

As illustrated in FIG. 6A, the dynamic multi-reader/single writer lock is in an initial state U(0,0,0), with U being stored in two bits $610_S$ in the state cache line $605_S$ and 0, 0 and 0 being stored in one bit $610_0$-$610_2$ in each of the cache lines for the cores $605_0$-$605_2$, respectively.

In FIG. 6B, the operation WRITE2 is processed to obtain a write lock for CORE2. Processing WRITE2 causes the state to transition from U(0,0,0) in FIG. 6A to L(0,0,0), with L being stored in two bits $610_S$ in the state cache line $605_S$. It should be noted that, in a preferred embodiment, the bits (i.e., 0,0,0) $610_0$-$610_2$ in each of the cache lines for the cores $605_0$-$605_2$, respectively, are not stored, thereby reducing the number of operations performed in obtaining a write lock.

In FIG. 6C, the operation WRITE1 is processed to obtain a write lock for CORE1. However, CORE2 is busy and holds a write lock so CORE1 waits for a lock, causing the state to not transition and remain L(0,0,0), with L being stored in two bits $610_S$ in the state cache line $605_S$. As described above with respect to FIG. 6B, in a preferred embodiment, the bits (i.e., 0,0,0) $610_0$-$610_2$ in each of the cache lines for the cores $605_0$-$605_2$, respectively, are not stored, thereby reducing the number of operations performed in obtaining a write lock.

In FIG. 6D, the operation UNLOCK2 is processed to release the write lock for CORE2. Processing UNLOCK2 causes the state to transition from L(0,0,0) in FIG. 6C back to U(0,0,0), with U being stored in two bits $610_S$ in the state cache line $605_S$.

In FIGS. 6E-6F, the operation READ1 is processed to obtain a read lock for CORE1. As illustrated in FIG. 6E, processing READ1 causes the state to transition in step 1 from U(0,0,0) in FIG. 6D to M(0,0,0) in a first cycle, with M being stored in two bits $610_S$ in the state cache line $605_S$. In a second step, as illustrated in FIG. 6F, state transitions from M(0,0,0) in FIG. 6E to M(0,1,0), with M being stored in two bits $610_S$ in the state cache line $605_S$ and 1 being stored in one bit $610_1$ in the cache line for the core $605_1$. As will be described below with respect to FIG. 6G, the M lock allows additional READ operations whereas the L lock described above with respect to FIG. 6B prevents other WRITE or READ operations.

In FIG. 6G, the operation READ2 is processed to obtain a read lock for CORE2. Processing READ2 causes the state to transition from M(0,1,0) in FIG. 6F to M(0,1,1), 1 being stored in one bit $610_2$ in the cache line for the core $605_2$.

In FIG. 6H, a first step of the operation WRITE0 is processed to obtain a write lock for CORE0. Processing the first step of WRITE0 causes the state to transition from M(0,1,1) in FIG. 6G to M(1,1,1), with 1 being stored in one bit $610_0$ in the cache line for the cores $605_0$. However, CORE0 waits (i.e., spins) for CORE1 to release its read lock obtained in FIGS. 6E-6F.

In FIG. 6I, the operation UNLOCK2 is processed to release the read lock for CORE2. Processing UNLOCK2 causes the state to transition from M(1,1,1) in FIG. 6H to M(1,1,0), with 0 being stored in one bit $610_2$ in the cache line for the cores $605_2$. However, CORE0 continues to wait (i.e., spins) for CORE1 to release its read lock obtained in FIGS. 6E-6F.

In FIG. 6J, the operation UNLOCK1 is processed to release the read lock for CORE1. As illustrated in FIG. 6J, processing UNLOCK1 causes the state to transition from M(1,1,0) in FIG. 6I to M(1,0,0), with 0 being stored in one bit $610_1$ in the cache line for the cores $605_1$.

Subsequently, as illustrated in FIGS. 6K-6L, CORE0 completes obtaining its write lock by causing the state to transition from M(1,0,0) to M(1,1,0) in FIG. 6K, with 1 being stored in one bit $610_1$ in the cache line for the core $605_1$ and from M(1,1,0) to M(1,1,1) in FIG. 6L, with 1 being stored in one bit $610_2$ in the cache line for the score $605_2$.

Figure 6P:
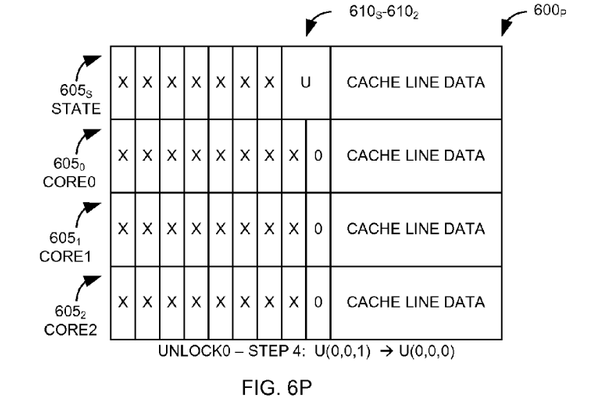

In FIGS. 6M-6N, the operation UNLOCK0 is processed to release the write lock obtained by CORE0 in FIGS. 6H-6L. As illustrated in FIG. 6M, processing UNLOCK0 causes the state to transition from M(1,1,1) in FIG. 6L to U(1,1,1) in a first step, with U being stored in two bits $610_S$ in the state cache line. In a second step, as illustrated in FIG. 6N, state transitions from U(1,1,1) in FIG. 6M to U(0,1,1), with 0 being stored in one bit $610_0$ in the cache line for the core $605_0$. In a third cycle, as illustrated in FIG. 6O, state transitions from U(0,1,1) in FIG. 6N to U(0,0,1), with 0 being stored in one bit $610_1$ in the cache line for the core $605_1$. In a fourth cycle, as illustrated in FIG. 6P, state transitions from U(0,0,1) in FIG. 6N to U(0,0,0), with 0 being stored in one bit $610_2$ in the cache line for the core$605_2$.

Figure 7:
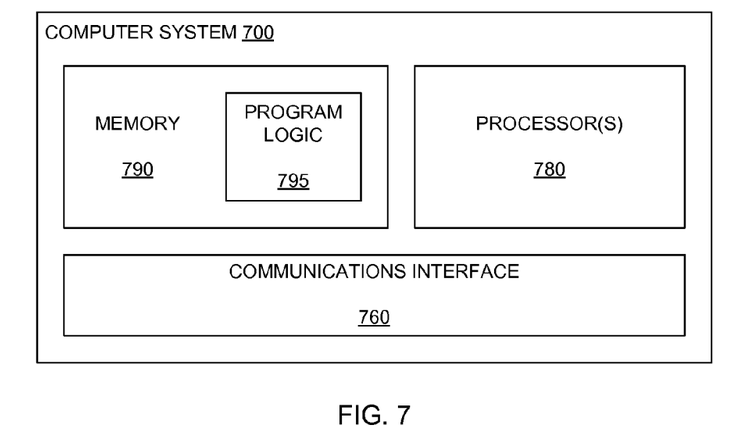
FIG. 7 is a block diagram of an example embodiment apparatus according to the present invention.

FIG. 7 is a block diagram of an example embodiment of a computer system 700 (e.g., computer system 200 of FIG. 2) according to the present invention. The computer system 700 includes memory 790 storing program logic 795, one or more processors 780 (i.e., multiple cores or a multi-core core) and a communications interface 760.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose cores, the program code combines with such a core to provide a unique apparatus that operates analogously to specific logic circuits. As such a general purpose digital machine can be transformed into a special purpose digital machine.

Figure 8:
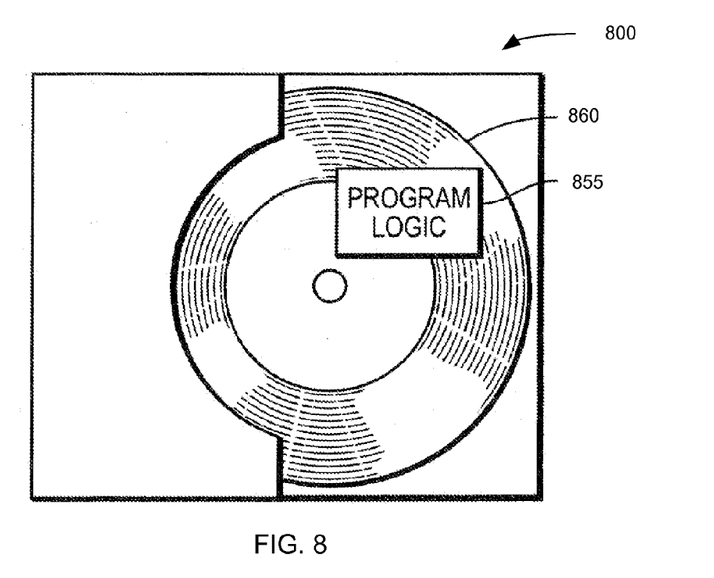
FIG. 8 is an illustration of an example embodiment of the present invention as embodied in program code.

FIG. 8 shows program logic 855 embodied on a computer-readable medium 860 as shown, and wherein the logic is encoded in computer-executable code configured for carrying out the gas controlling process of this invention and thereby forming a computer program product 800.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
providing a spinlock per core in a multi-core computer system;
storing each spinlock in a respective memory location configured to be accessed independently by respective cores of the multi-core computer system;
receiving a request at a core in the multi-core computer system to perform an operation on a spinlock in the multi-core computer system;
obtaining a multi-reader/single writer spinlock in response to the request;
monitoring requests to perform operations on spinlocks in the multi-core computer system; and
managing selection of a single reader/single writer spinlock and the multi-reader/single writer spinlock by analyzing a number of requests to perform operations on spinlocks, obtaining multi-reader/single writer spinlocks if the number of requests to perform operations indicates that multi-reader/single writer spinlocks are more efficient than single reader/single writer spinlocks for processing the number of requests to perform operations on spinlocks, and obtaining single reader/single writer spinlocks if the number of requests to perform operations indicates that single reader/single writer spinlocks are more efficient than multi-reader/single writer spinlocks for processing the number of requests to perform operations on spinlocks.

2. The method of claim 1 wherein obtaining a multi-reader/single writer spinlock in response to the request comprises:
if the request is a read request, obtaining a spinlock allocated to the core in the multi-core computer system; and
if the request is a write request, obtaining spinlocks allocated to each core in the multi-core computer system.

3. The method of claim 2 wherein the core in the multi-core computer system is a first core in the multi-core computer system, the method further comprising:
receiving a subsequent read request for the same spinlock from a second core in the multi-core computer system; and
setting a subsequent read lock in a memory location allocated to the second core in the multi-core computer system.

4. The method of claim 1 wherein the request is a write request and wherein acquiring a spinlock from a plurality of spinlocks comprises setting write locks in memory locations allocated to each core of the multi-core computer system.

5. The method of claim 1 wherein analyzing a number of requests to perform operations on spinlocks includes determining a number of read operations and wherein obtaining multi-reader/single writer spinlocks if the number of requests to perform operations indicates that multi-reader/single writer spinlocks are more efficient than single reader/single writer spinlocks for processing the number of requests to perform operations on spinlocks includes obtaining multi-reader/single writer spinlocks if the number of read operations exceeds a threshold.

6. The method of claim 1 wherein analyzing a number of requests to perform operations on spinlocks includes determining a number of read/write and write operations and wherein obtaining multi-reader/single writer spinlocks if the number of requests to perform operations indicates that multi-reader/single writer spinlocks are more efficient than single reader/single writer spinlocks for processing the number of requests to perform operations on spinlocks includes obtaining single reader/single writer spinlocks if the number of read/write and write operations exceeds a threshold.

7. The method of claim 1 wherein the operations on spinlocks include performing compare and swap operations.

8. The method of claim 1 further comprising storing a state of the multi-reader/single writer spinlock.

9. A multi-core computer system comprising:
a plurality of cores; and
memory storing computer-executable logic that, when executed by the multi-core computer system, causes the multi-core computer system to perform the operations of:
providing a spinlock per core in the multi-core computer system;
storing each spinlock in a respective memory location configured to be accessed independently by respective cores of the multi-core computer system;
receiving a request at a core in the multi-core computer system to perform an operation on a spinlock in the multi-core computer system;
obtaining a multi-reader/single writer spinlock in response to the request;
monitoring requests to perform operations on spinlocks in the multi-core computer system; and
managing selection of a single reader/single writer spinlock and the multi-reader/single writer spinlock by analyzing a number of requests to perform operations on spinlocks, obtaining multi-reader/single writer spinlocks if the number of requests to perform operations indicates that multi-reader/single writer spinlocks are more efficient than single reader/single writer spinlocks for processing the number of requests to perform operations on spinlocks, and obtaining single reader/single writer spinlocks if the number of requests to perform operations indicates that single reader/single writer spinlocks are more efficient than multi-reader/single writer spinlocks for processing the number of requests to perform operations on spinlocks.

10. The multi-core computer system of claim 9 wherein obtaining a multi-reader/single writer spinlock in response to the request comprises:
if the request is a read request, obtaining a spinlock allocated to the core in the multi-core computer system; and
if the request is a write request, obtaining spinlocks allocated to each core in the multi-core computer system.

11. The multi-core computer system of claim 10 wherein the core in the multi-core computer system is a first core in the multi-core computer system and wherein the memory stores further computer-executable logic that, when executed by the multi-core computer system, causes the multi-core computer system to perform the further operations of:
receiving a subsequent read request for the same spinlock from a second core in the multi-core computer system; and setting a subsequent read lock in a memory location allocated to the second core in the multi-core computer system.

12. The multi-core computer system of claim 9 wherein the request is a write request and wherein acquiring a spinlock from a plurality of spinlocks comprises setting write locks in memory locations allocated to each core of the multi-core computer system.

13. The multi-core computer system of claim 9 wherein analyzing a number of requests to perform operations on spinlocks includes determining a number of read operations and wherein obtaining multi-reader/single writer spinlocks if the number of requests to perform operations indicates that multi-reader/single writer spinlocks are more efficient than single reader/single writer spinlocks for processing the number of requests to perform operations on spinlocks includes obtaining multi-reader/single writer spinlocks if the number of read operations exceeds a threshold.

14. The multi-core computer system of claim 9 wherein analyzing a number of requests to perform operations on spinlocks includes determining a number of read/write and write operations and wherein obtaining multi-reader/single writer spinlocks if the number of requests to perform operations indicates that multi-reader/single writer spinlocks are more efficient than single reader/single writer spinlocks for processing the number of requests to perform operations on spinlocks includes obtaining single reader/single writer spinlocks if the number of read/write and write operations exceeds a threshold.

15. The multi-core computer system of claim 9 wherein the operations on spinlocks include performing compare and swap operations.

16. The multi-core computer system of claim 9 wherein the memory stores further computer-executable logic that, when executed by the multi-core computer system, causes the multi-core computer system to perform the further operation of storing a state of the multi-reader/single writer spinlock.

17. A computer program product including a non-transitory computer readable storage medium having computer program code stored thereon for managing spinlocks in a multi-core computer system, the computer program product comprising:

computer program code for providing a spinlock per core in the multi-core computer system;

computer program code for storing each spinlock in a respective memory location configured to be accessed independently by respective cores of the multi-core computer system;

computer program code for receiving a request at a core in the multi-core computer system to perform an operation on a spinlock in the multi-core computer system;

computer program code for obtaining a multi-reader/single writer spinlock in response to the request;

computer program code for monitoring requests to perform operations on spinlocks in the multi-core computer system; and     computer program code for managing selection of a single reader/single writer spinlock and the multi-reader/single writer spinlock by analyzing a number of requests to perform operations on spinlocks, obtaining multi-reader/single writer spinlocks if the number of requests to perform operations indicates that multi-reader/single writer spinlocks are more efficient than single reader/single writer spinlocks for processing the number of requests to perform operations on spinlocks, and obtaining single reader/single writer spinlocks if the number of requests to perform operations indicates that single reader/single writer spinlocks are more efficient than multi-reader/single writer spinlocks for processing the number of requests to perform operations on spinlocks.

\* \* \* \* \*